(12) United States Patent
Morita

(10) Patent No.: US 6,661,684 B2
(45) Date of Patent: Dec. 9, 2003

(54) AC-TO-DC CONVERTER

(75) Inventor: Koichi Morita, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 10/082,464

(22) Filed: Feb. 25, 2002

(65) Prior Publication Data

US 2002/0118553 A1 Aug. 29, 2002

(30) Foreign Application Priority Data

Feb. 26, 2001 (JP) ........................................ 2001-049569

(51) Int. Cl.⁷ ................................................ H02M 7/04
(52) U.S. Cl. ...................... 363/89; 323/222; 323/288; 363/90
(58) Field of Search ............................... 363/34, 37, 44, 363/80–82, 89, 90, 125, 127; 323/222, 266, 284, 299, 301, 288

(56) References Cited

U.S. PATENT DOCUMENTS

| | | | | |
|---|---|---|---|---|
| 5,283,727 A | * | 2/1994 | Kheraluwala et al. | ........ 363/98 |
| 5,406,192 A | * | 4/1995 | Vinciarelli | ................... 323/222 |
| 5,644,214 A | * | 7/1997 | Lee | ............................. 323/211 |
| 5,856,917 A | * | 1/1999 | Aonuma et al. | ......... 363/21.04 |
| 6,069,811 A | * | 5/2000 | Moriguchi et al. | ......... 363/142 |
| 6,373,735 B2 | * | 4/2002 | Usui | ............................ 363/89 |

OTHER PUBLICATIONS

Article regarding *Power Factor Controllers*—MC 34262/D—pp. 1–16 (Motorola, Inc. 1996) no month.

* cited by examiner

*Primary Examiner*—Adolf D. Berhane
*Assistant Examiner*—Gary L. Laxton
(74) *Attorney, Agent, or Firm*—Howard & Howard

(57) ABSTRACT

A voltage at a capacitor included in a peak detector is equal to a peak output voltage of a full-wave rectifier. A comparator included in a monitor circuit compares an output voltage of the peak detector with a voltage appearing at the capacitor. The comparator inputs a voltage signal corresponding to a compared result, to a switching controller. The switching controller controls a switching operation of a switching device. A power-factor control circuit controls a charge/discharge operation of the capacitor in accordance with a switching operation of the switching device, in a case where an output voltage of a DC-to-DC converter is equal to or less than reference power Pstd [W]. In the case where the output voltage of the DC-to-DC converter is greater than the reference power, the power-factor control circuit controls the charge/discharge operation by directly supplying the capacitor with a current output from a full-wave rectifier.

17 Claims, 10 Drawing Sheets

AC-TO-DC CONVERTER

BACKGROUND OF THE INVENTION

1. Field of the Invention

The present invention relates to a power-factor control circuit in an AC-to-DC converter, and, more particularly, to a small-sized AC-to-DC converter which can be manufactured at low cost and maintains an output voltage thereof with high efficiency.

2. Description of the Related Art

AC-to-DC converters are used generally as switching regulators for audio system. FIG. 1 shows an example of the structure of a conventional AC-to-DC converter. A full-wave rectifier, comprising four diodes 72 to 75 in a power-factor control circuit 71 shown in FIG. 1, rectifies a voltage applied by an AC power source 70. A switching controller 80 applies a driving signal to a switching device 79, in order to control the "open" and "closed" conditions of the switching device 79. In the case where the switching device 79 is closed, the electromagnetic energy is accumulated in an inductor 76. In this case, the current flowing to and through the inductor 76 increases in proportion to time. In the case where the switching device 79 is open, the electromagnetic energy is transmitted from the inductor 76 to a capacitor 81 through a diode 77. As a result, the capacitor 81 is charged. To prevent the switching device 79 from being destructed due to heat and prevent an increase in the loss of power consumption, an output current of the power-factor control circuit 71 is limited by a non-illustrative protecting circuit. Without the protecting circuit, the copper loss or iron loss in the inductor 76 increases. Otherwise, the core saturation may occur in the inductor 76.

In accordance with a switching operation of such a switching device 79, an output voltage (i.e. a voltage of the capacitor 81) of the power-factor control circuit 71 is retained at a constant voltage greater than the amplitude of the voltage supplied from the AC power source 70, regardless of the size of a voltage input from the AC power source 70 to the power-factor control circuit 71. For example, in the case where the AC power source 70 is 100 volt AC, the output voltage of the power-factor control circuit 71 is retained at 160V or 190V. In the case where the AC power source 70 is 240 volt AC, the output voltage of the power-factor control circuit 71 is retained at 400V.

Two switching devices 83 and 84 included in a DC-to-DC converter 82 connected to the capacitor 81 are complementary switching devices. In other words, when the switching device 83 is open, the switching device 84 is closed, and when the switching device 83 is closed, the switching device 84 is open. As a result of this switching operation of the switching devices 83 and 84, currents flow to the primary winding of the transformer 85 alternatively, and an AC voltage is generated by the secondary winding of the transformer 85. A rectification circuit comprising diodes 88 to 91 rectifies a voltage received from the transformer 85, to generate a DC voltage. The DC voltage output from the rectification circuit is applied to capacitors 92 and 93. The voltage at the capacitors 92 and 93 are retained at a constant level by a non-illustrative voltage controller. The voltage at the capacitors 92 and 93 are applied to loads 94 and 95, and resulting in that DC power is transmitted to the loads 94 and 95.

In the normal use of the audio system, when an audio system generates a big sound, the average power consumed by the loads 94 and 95 is in a range between 1/50 and 1/8 of the maximum power consumption. Even in the case where the audio system generates a rare extremely big noise, the average power consumed by the loads 94 and 95 is in a range between one sixteenth and half of the maximum power consumption. Though the average consumed power is very little, it is necessary to design the switching regulator not to be destructed even in the state where the maximum power is consumed. As a result, the power can not effectively be consumed in the normal use of the AC-to-DC converter, and the improvement of the power factor can not result in a desirable effect. In addition, the cost of each component included in the AC-to-DC converter increases.

In contrast to the above, a large amount of power is consumed in a moment, when sounds of musical instrument (e.g. sounds of piano, drum, etc.) which have low frequency components and have an attack sound segment having the large amplitude, or when a mixed sound of a high tone sound and a low tone sound is output. By the effect of the restriction in an output current of the power-factor control circuit 71, currents flowing to and through the loads 94 and 95 are restricted as well. Hence, in the case where the power consumed by the loads 94 and 95 exceeds its restriction, the voltage applied to the loads 94 and 95 suddenly drops. FIG. 2 shows the relationship between output power of a DC-to-DC converter 82 and an output voltage of a power-factor control circuit 71, in the AC-to-DC converter shown in FIG. 1. As shown in FIG. 2, when the output power of the DC-to-DC converter 82 is the maximum power consumption Pmax [W], the output voltage of the power-factor control circuit 71 suddenly drops. In such circumstances, the linearity of the audio output from the audio system will remarkably be deteriorated. In the power-factor control circuit 71 wherein the output current is restricted in association with the power consumed by the loads 94 and 95, the inductor 76, the switching device 79 and the diode 77 are large in size, and hence the volume of the power-factor control circuit 71 will be increased. For example, the volume of the power-factor control circuit 71, whose output current is limited in association with the maximum consumption power of the loads 94 and 95, increases two or sixteen times more than that in the general case where the output current is controlled by the protecting circuit. Additionally, there will be an increase in the component cost and the cost of manufacturing the AC-to-DC converter.

SUMMARY OF THE INVENTION

The present invention has been made in consideration of the above. It is accordingly an object of the present invention to provide an AC-to-DC converter which is small in size, can be manufactured at low cost, and operates with high efficiency.

Another object thereof is to provide an AC-to-DC converter, whose output-voltage variation can be restricted, in the case where the AC-to-DC converter outputs a large amount of power.

In order to attain the above objects, according to one aspect of the present invention, there is provided an AC-to-DC converter comprising:

a power-factor control circuit which is coupled to an AC power source;

a capacitor which has a first electrode and a second electrode, and whose charge/discharge operation is controlled by the power-factor control circuit; and a converter which is coupled to the capacitor, and
wherein the power-factor control circuit includes
a rectifier which is coupled to the AC power source, a detector which detects a peak output voltage of the rectifier, a switching device which executes a switching operation for charging the capacitor, and a switching controller which controls the switching operation of the switching device, based on a detected result of the detector.

In this structure, the power-factor control circuit may charge the capacitor in accordance with the switching operation of the switching device, such that a voltage in the capacitor will be equal to the peak output voltage detected by the detector or greater than a peak output voltage of the detector by a predetermined amount of voltage.

The power-factor control circuit may include:

an inductor which has a first terminal, coupled to a positive output terminal of the rectifier, and a second terminal; and a first device which is conducted to the capacitor in order to supply the capacitor with a current, and which is coupled between the second terminal of the inductor and the first electrode of the capacitor.

In this structure, the switching device may be coupled between the second terminal of the inductor and the second electrode of the capacitor.

The first device may be a diode having an anode coupled to the second terminal of the inductor and a cathode coupled to the first electrode of the capacitor.

The inductor may have a third terminal; and the first device may be an n-channel type field effect transistor having a source coupled to the second terminal of the inductor, a drain coupled to the first electrode of the capacitor, and a gate coupled to the third terminal of the inductor.

Otherwise, the inductor may have a third terminal; and the first device may be a p-channel type field effect transistor having a source coupled to the first electrode of the capacitor, a drain coupled to the third terminal of the inductor, and a gate coupled to the second terminal of the inductor.

The power-factor control circuit may include a second device coupled to the inductor and the first device in parallel thereto, in order to transmit a current from the rectifier to the capacitor in a case where a voltage of the capacitor drops.

The second device may be a diode having an anode coupled to a positive output terminal of the rectifier and a cathode coupled to the first electrode of the capacitor.

The second device may include:

a first diode coupled between one end of the AC power source and the first electrode of the capacitor; and a second diode coupled between other end of the AC power source and the first electrode of the capacitor.

The power-factor control circuit may:

control a charge/discharge operation of the capacitor in accordance with the switching operation of the switching device, in a case where output power of the AC-to-DC converter is equal or less than predetermined reference power; and control the charge/discharge operation of the capacitor by a current flowing to and through the second device, in a case where the output power of the AC-to-DC converter is equal to or greater than the reference power.

The reference power may be within a range between one sixteenth and half of maximum power consumption.

The AC-to-DC converter may include a voltage controller for controlling an output from the converter.

The detector may include a semiconductor element which has an anode coupled to a positive output terminal of the rectifier, and a cathode; and a capacitive element which is coupled between the cathode of the semiconductor element and a negative output terminal of the rectifier.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will now be described with reference to the accompanying drawings.

Figure 1:
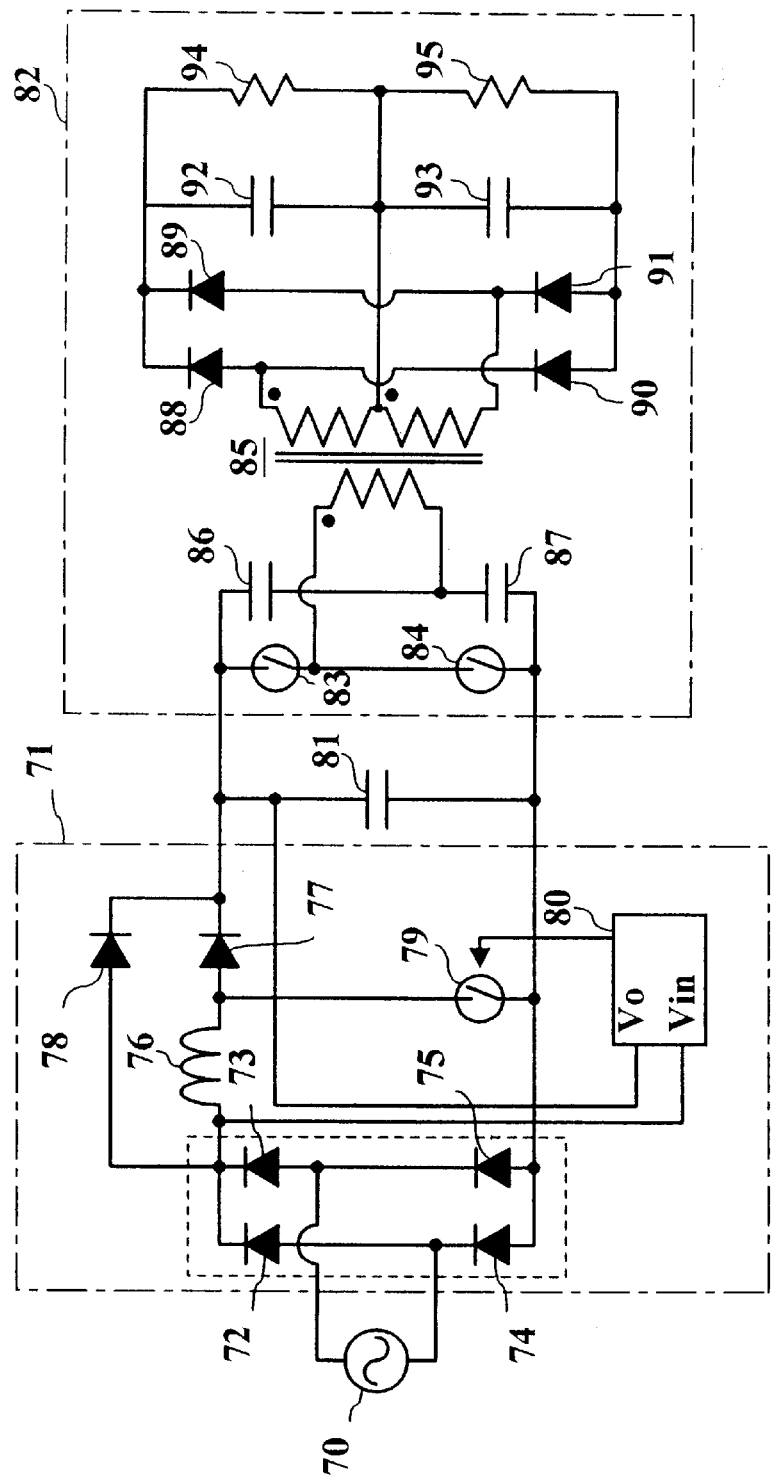
FIG. 1 is a diagram showing an AC-to-DC converter.
Figure 2:
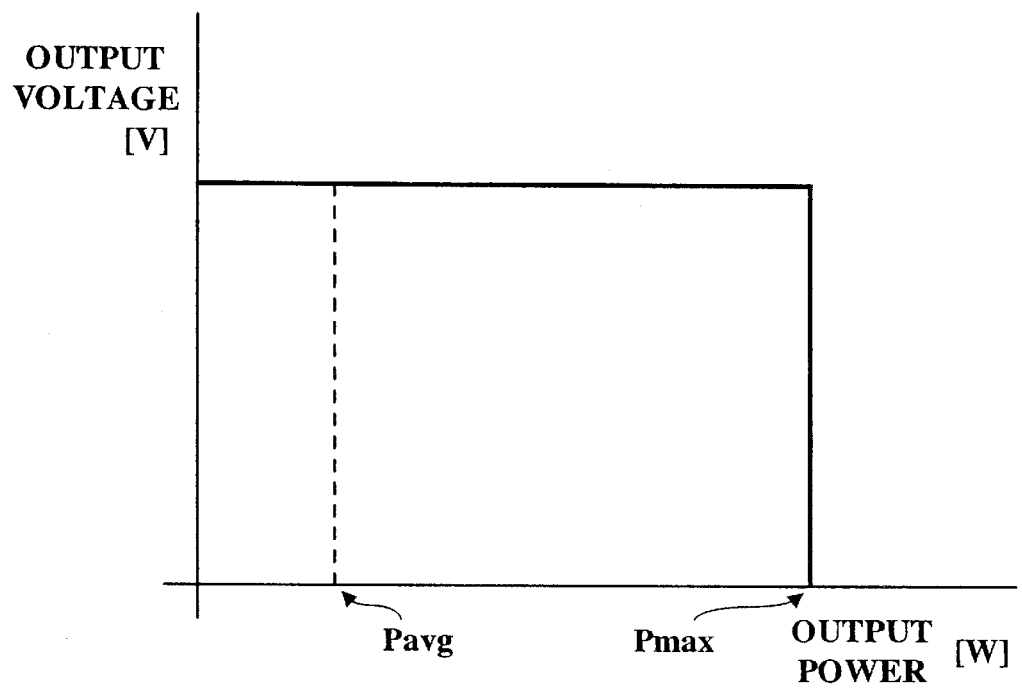
FIG. 2 is a diagram showing the relationship between output power of a DC-to-DC converter and an output voltage of a power-factor control circuit, in the AC-to-DC converter shown in FIG. 1.
Figure 3:
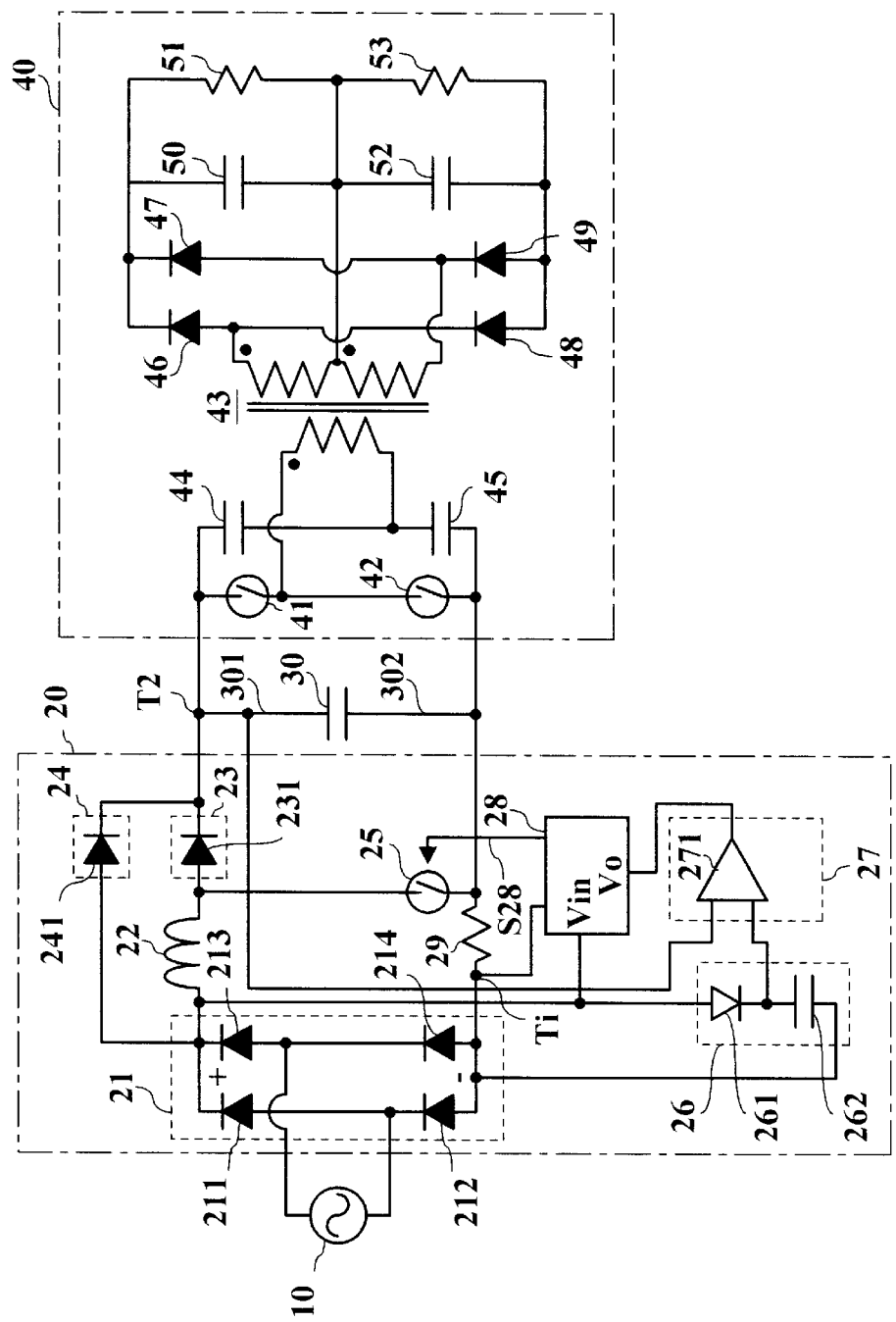
FIG. 3 is a diagram showing an AC-to-DC converter according to an embodiment of the present invention.

An AC-to-DC converter according to an embodiment of the present invention is illustrated in FIG. 3. The AC-to-DC converter includes a power-factor control circuit 20 coupled to an AC power source 10, a capacitor 30 coupled to the output of the AC power source 10, and a DC-to-DC converter 40 coupled to the capacitor 30. In the case where the output power of the DC-to-DC converter 40 is equal to or less than a preset reference power level, the power-factor control circuit 20 charges the capacitor 30 in accordance with a switching operation. In the case where the output power of the DC-to-DC converter 40 is greater than the present reference power level, the power-factor control circuit 20 forms a by-pass for supplying the capacitor 30 with a current obtained through rectification of the input from the AC power source 10, and charges the capacitor 30 using the formed by-pass. In this structure, the power-factor control circuit 20 is smaller in size than the conventional circuit, and can be manufactured at lower cost than the case of the conventional circuit. Additionally, even if the output power of the DC-to-DC converter 40 suddenly increases, a sudden drop of the output voltage is avoidable. As a result of this, a small and efficient AC-to-DC converter can be realized at low cost.

The power-factor control circuit 20 comprises a full-wave rectifier 21, an inductor 22, a rectification device 23, a by-pass device 24, a switching device 25, a peak detector 26, a monitor circuit 27, a switching controller 28 and a resistor 29.

The full-wave rectifier 21 comprises four diodes 211, 212, 213 and 214. The diode 211 has an anode and a cathode. The diode 212 has an anode and a cathode, which is coupled both to the anode of the diode 211 and one end of the AC power source 10. The diode 213 has an anode and a cathode, which is coupled both to the cathode of the diode 211 and a positive output terminal (+) of the full-wave rectifier 21. The diode 214 has an anode, which is coupled both to the anode of the diode 212 and a negative output terminal (−) of the full-wave rectifier 21, and a cathode, which is coupled both to the anode of the diode 213 and the other end of the AC power source 10.

The inductor 22 includes a first terminal coupled to the positive output terminal (+) of the full-wave rectifier 21 and a second terminal coupled to the input of the rectification device 23.

In this embodiment, the rectification device 23 is a diode 231. The diode 231 has an anode serving as the input of the rectification device 23 and a cathode as the output thereof. The cathode of the diode 231 is coupled to one output of the power-factor control circuit 20.

The by-pass device 24 is a diode 241. The diode 241 has an anode, which is coupled to the node between the positive output terminal (+) of the full-wave rectifier 21 and the inductor 22, and a cathode, which is coupled both to the cathode of the diode 231 and the output of the power-factor control circuit 20.

In this embodiment, the switching device 25 is a MOS (Metal-Oxide Semiconductor) transistor. The switching device 25 is coupled between the anode of the diode 231 and the other output of the power-factor control circuit 20. In response to a driving signal S28 supplied from the switching controller 28, the switching device 25 is switched between the two discrete conditions of "open" and "closed".

The peak detector 26 includes a diode 261 and a capacitor 262. The diode 261 has an anode, which is coupled to the node between the positive output terminal (+) of the full-wave rectifier 21 and the inductor 22, and a cathode. The capacitor 262 has a first electrode coupled to the cathode of the diode 261 and a second electrode coupled to the negative output terminal (−) of the full-wave rectifier 21.

In this embodiment, the monitor circuit 27 includes a comparator 271. The comparator 271 includes two inputs and one output. One input of the comparator 271 is coupled to the output of the power-factor control circuit 20, to which the cathodes of the diodes 231 and 241 are coupled, and the other input thereof is coupled to the node between the cathode of the diode 261 and the capacitor 262. The output of the comparator 271 is coupled to the switching controller 28.

Figure 4:
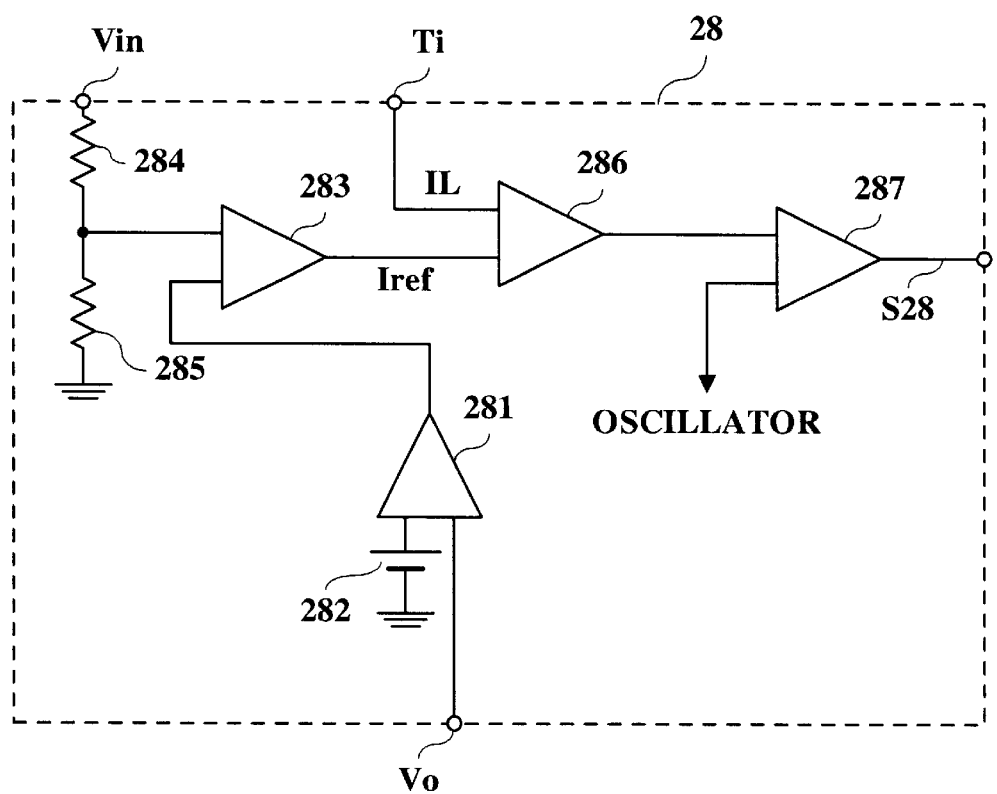
FIG. 4 is a diagram showing a switch controller for the AC-to-DC converter of FIG. 3.

The switching controller 28 has the structure as shown in FIG. 4, in this embodiment. The switching controller 28 includes voltage-input terminals Vin and Vo, a differential amplifier 281, a DC voltage source 282, a multiplier 283, resistors 284 and 285 and comparators 286 and 287.

The voltage-input terminal Vin is coupled to the positive output terminal (+) of the full-wave rectifier 21. The voltage-input terminal Vo is coupled to the output of the comparator 271. The differential amplifier 281 includes a first input terminal coupled to the voltage-input terminal Vo, a second input terminal coupled to the DC voltage source 282 to receive a DC reference applied thereby, and an output terminal. The multiplier 283 includes a first input terminal coupled to an output terminal of the differential amplifier 281, a second input terminal coupled to a resistance divider comprising the resistors 284 and 285, and an output terminal. The resistor 284 includes a first terminal coupled to the voltage-input terminal Vin, and a second terminal coupled to the multiplier 283 and the resistor 285. The resistor 285 includes a first terminal coupled to the multiplier 283 and the resistor 284, and a second terminal coupled to the ground. The comparator 286 includes a first input terminal coupled to the output terminal of the multiplier 283, a second input terminal coupled to a terminal Ti to input a voltage IL representing a switching current flowing to the switching device 25, and an output terminal. The comparator 287 includes a first input terminal coupled to the output terminal of the comparator 286, a second input terminal coupled to a non-illustrative oscillator, and an output terminal for outputting the driving signal S28 applied to the switching device 25. For example, a triangle-wave reference is input to the second input terminal of the comparator 287.

In this embodiment, the DC-to-DC converter 40 shown in FIG. 3 is a current-resonance half bridge. The DC-to-DC converter 40 sends DC power to each of loads 51 and 53. Any type of DC-to-DC converter known in the art can be adopted as the DC-to-DC converter 40 included in the embodiment of the present invention. The DC-to-DC converter 40 includes two switching devices 41 and 42, a transformer 43, four capacitors 44, 45, 50, 52 and four diodes 45, 47, 48, and 49. The switching device 41 is coupled between an electrode 301 of the capacitor 30 and a hot terminal of the primary winding in the transformer 43. The switching device 42 is coupled between an electrode 302 of the capacitor 30 and the hot terminal of the primary winding of the transformer 43. In response to a control signal (not illustrated) which is to be externally transmitted, the switching devices 41 and 42 will be open and closed complementarily to each other. The capacitor 44 is coupled between the electrode 301 of the capacitor 30 and a cold terminal of the primary winding in the transformer 43. The capacitor 45 is coupled between the electrode 302 of the capacitor 30 and the cold terminal of the primary winding in the transformer 43.

The secondary winding of the transformer 43 has a center tap, and is coupled to a rectifier comprising four diodes 46 to 49. The diode 46 has an anode and a cathode. The diode 47 has an anode and a cathode, which is coupled to the cathode of the diode 46. The diode 48 has an anode and a cathode, which is coupled both to an anode of the diode 46 and a hot terminal of the secondary winding in the transformer 43. The diode 49 has an anode, which is coupled to the anode of the diode 48, and a cathode, which is coupled both to the anode of the diode 47 and the cold terminal of the secondary winding in the transformer 43. The capacitor 50 is coupled between the center tap of the secondary winding of the transformer 43 and the cathodes of the respective diodes 46 and 47, in parallel with the load 51. The capacitor 52 is coupled between the center tap of the secondary winding of the transformer 43 and the anodes of the respective diodes 48 and 49, in parallel with the load 53.

Operations of the AC-to-DC converter according to the embodiment of the present invention will now be explained.

The power-factor control circuit 20 controls a charge/discharge operation of the capacitor 30. More specifically, the full-wave rectifier 21 included in the power-factor control circuit 20 rectifies a voltage supplied from the AC power source 10. In the normal use of the AC-to-DC converter, the switching device 25 is switched between the conditions of "open" and "closed", in response to the driving signal S28 output from the switching controller 28.

In the case where the switching device 25 is closed, electromagnetic energy is accumulated in the inductor 22. On the contrary, in the case where the switching device 25 is open, an electromotive force appears between terminals of the inductor 22. In response to this electromotive force, the diode 231 is turned on, resulting in that the electromagnetic energy accumulated in the inductor 22 is sent to the capacitor 30.

The output voltage of the full-wave rectifier 21 has a certain level of ripple. In the case where the voltage rises at the positive output terminal (+) of the full-wave rectifier 21, the diode 261 of the peak detector 26 is turned on, thereafter charging the capacitor 262. In the case where the voltage drops from the peak output voltage at the positive output terminal (+) of the full-wave rectifier 21, the diode 261 is turned off. As a result of this, the voltage at the capacitor 262 is equal to the peak output voltage of the full-wave rectifier 21. The voltage appearing at the capacitor 262 is applied to the comparator 271, as the output of the peak detector 26. The comparator 271 compares the output voltage of the peak detector 26 and the voltage appearing at the capacitor 30. In the case where the voltage at the capacitor 30 is greater than the output voltage of the peak detector 26, the comparator 271 supplies the voltage-input terminal Vo of the switching controller 28 with a high-voltage signal. On the contrary, in the case where the voltage at the capacitor 30 is less than the output voltage of the peak detector 26, the comparator 271 supplies the voltage-input terminal Vo with a low-voltage signal. Further, in the case where the voltage at the capacitor 30 is equal to the output voltage of the peak detector 26, a standard-voltage signal is output from the comparator 271.

The differential amplifier 281 included in the switching controller 28 supplies the multiplier 283 with a voltage corresponding to a difference between the output voltage of the comparator 271 and the voltage of the DC voltage source 282. The multiplier 283 outputs a reference voltage Iref, which is a product of the output voltage of the full-wave rectifier 21 and the output voltage of the differential amplifier 281. The output voltage of the full-wave rectifier 21 is reduced in magnitude at the input of the multiplier 283 by the resistance divider comprising resistors 284 and 285. The output voltage of the differential amplifier 281 regulates a proportionality coefficient for generating the reference voltage Iref. In the case where the voltage at the capacitor 30 is greater than the output voltage of the peak detector 26, the proportionality coefficient in the multiplier 283 has a small value. In the case where the voltage at the capacitor 30 is less than the output voltage of the peak detector 26, the proportionality coefficient in the multiplier 283 has a large value.

The comparator 286 compares the reference voltage Iref with a voltage IL, appearing at the resistor 29 in accordance with a current flowing to the inductor 22 and the switching device 25. As the voltage IL gets smaller than the reference voltage Iref, the output voltage of the comparator 286 rises, and vice versa.

In this embodiment, the comparator 287 realizes PWM (Pulse Width Modulation). For example, the comparator 287 compares the triangle-wave reference with the output voltage of the comparator 286. Based on a result of the comparison, the comparator 287 generates a driving signal S28 to be supplied to the switching device 25. In this embodiment, in the case where the output voltage of the comparator 286 is greater than the triangle-wave reference, the driving signal S28 will be "H" (High). On the contrary, in the case where the output voltage of the comparator 286 is less than the triangle-wave reference, the driving signal S28 will be "L" (Low). The switching device 25 will be closed and open, depending on whether the driving signal S28 is "H" and "L", respectively.

In accordance with the switching operation of the switching device 25, the voltage of the capacitor 30, i.e. the output voltage of the power-factor control circuit 20 traces the peak amplitude in the output signal of the AC power source 10. In the case where the voltage of the capacitor 30 is less than the peak output voltage of the full-wave rectifier 21, the switching device 25 is closed for a long period of time, and hence resulting in that the voltage of the capacitor 30 increases. In the case where the voltage of the capacitor 30 is greater than the peak output voltage of the full-wave rectifier 21, the switching device 25 is closed for a short period of time, and hence resulting in that the voltage of the capacitor 30 decreases.

Figure 5:
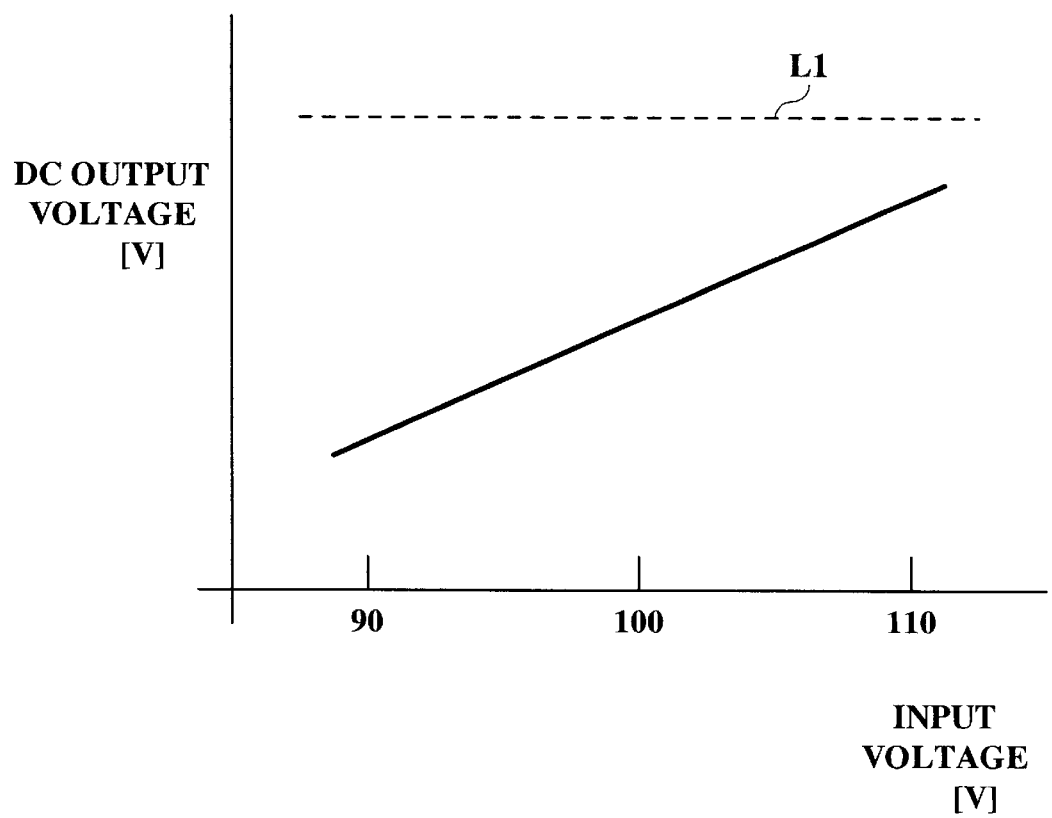
FIG. 5 is a diagram showing DC output-voltage characteristics of a power-factor control circuit included in the AC-to-DC converter of FIG. 3.

FIG. 5 shows DC output voltage characteristics of the power-factor control circuit 20 included in the AC-to-DC converter according to the embodiment of the present invention. In FIG. 5, the y-axis defines the current output voltage of the power-factor control circuit 20, whereas the x-axis defines the input voltage of the power-factor control circuit 20. A broken line L1 in FIG. 5 shows the DC output-voltage characteristics of a conventional power-factor control circuit. As represented by the broken line L1, the conventional power-factor control circuit 20 outputs a constant voltage which is greater than its input voltage, regardless of the size of the input voltage. On the other hand, in the power-factor control circuit in this embodiment, the DC output voltage coincides with the peak output voltage of the full-wave rectifier 21.

Figure 6:
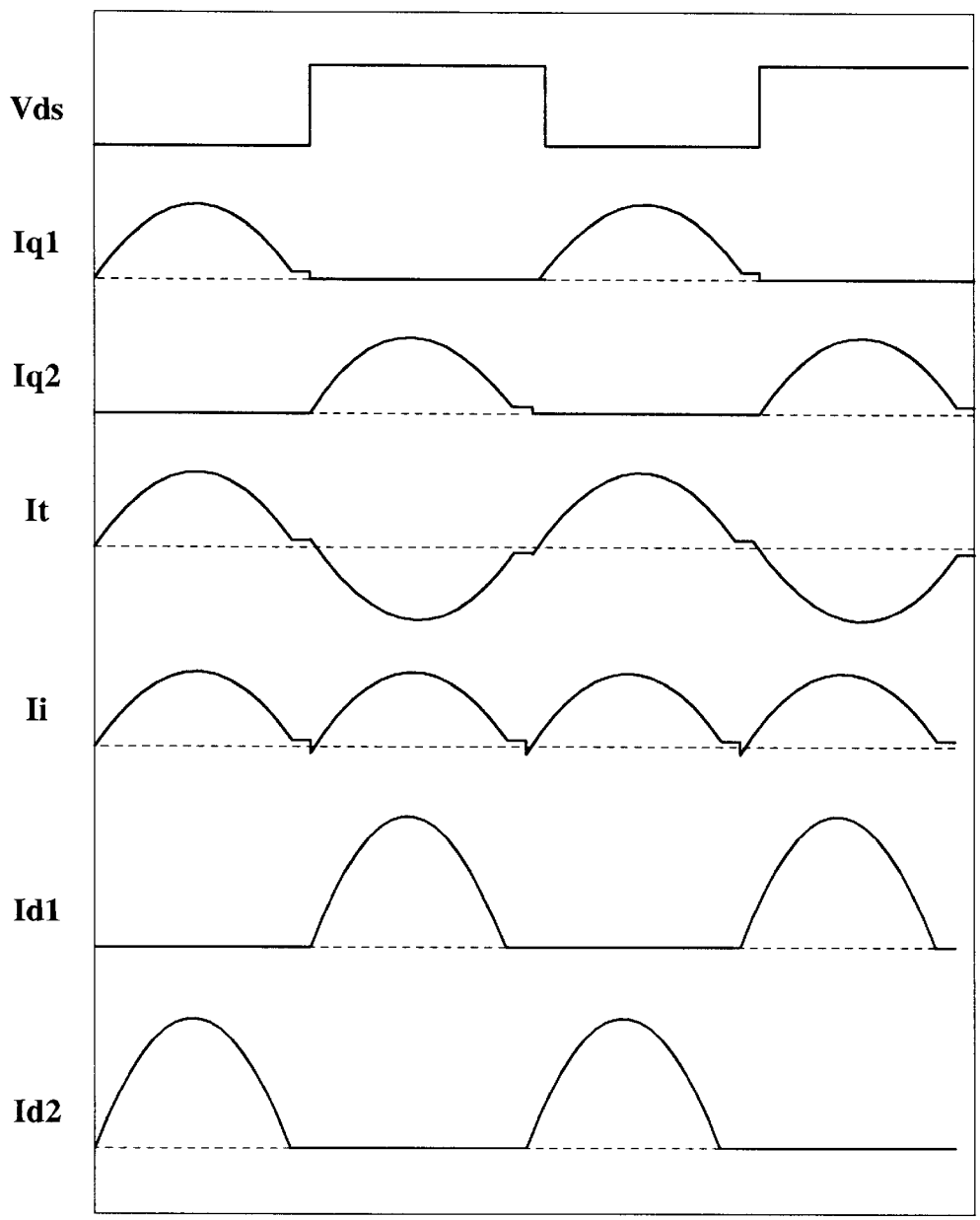
FIG. 6 is a signal diagram of various signals in the AC-to-DC converter shown in FIG. 3.

The operational principle of the DC-to-DC converter 40 can satisfactorily be explained with reference to a signal diagram shown in FIG. 6. FIG. 6 shows a voltage Vds and currents Iq1, Iq2, It, Ii, Id1 and Id2. The voltage Vds is a voltage between switching terminals of the switching device 41. The current Iq1 is a current flowing to the switching device 41. The current Iq2 is a current flowing to the switching device 42. The current It is a current flowing to the primary winding of the transformer 43. The current Ii is an input current of the DC-to-DC converter 40. The currents Id1 and Id2 are currents flowing to the diodes 46 and 47, respectively.

When an externally-transmitted control signal (not illustrated) is "L", the switching device 41 is switched to be closed. The closed switching device 41 increases the current Iq1. The current flowing to and through the switching device 41 flows to the capacitor 45 through the primary winding in the transformer 43. As the voltage of the capacitor 45 increases, the current Iq1 decreases. When the switching device 41 is open, the switching device 42 is closed. The closed switching device 42 increases the current Iq2. The switching device 42 lets the current flow to the primary winding of the transformer 43, in a direction opposite to the current flowing direction when the switching device 41 is closed. As a result of this, the capacitor 30 provides the primary winding of the transformer 43 with a current alternatively. A voltage corresponding to the current flowing to the primary winding appears at the secondary winding of the transformer 43. The rectifier comprising the diodes 46 to 49 rectifies the voltage appearing at the secondary winding of the transformer 43, to charge the capacitors 50 and 52. The voltages of the capacitors 50 and 52 are applied to the loads 51 and 53, respectively. This results in that the power is transmitted to the loads 51 and 53.

In the case where the AC-to-DC converter according to this embodiment is adopted into an audio system, the large power consumption of the loads 51 and 53 leads to a voltage drop of the capacitor 30. As a result that the voltage of the capacitor 30 drops, the diode 241 is turned on, and a current flows directly from the full-wave rectifier 21 to the capacitor 30. Upon this, even if the current flowing to the loads 51 and 53 suddenly increases, the output voltage of the DC-to-DC converter 40 does not suddenly drop.

Figure 7:
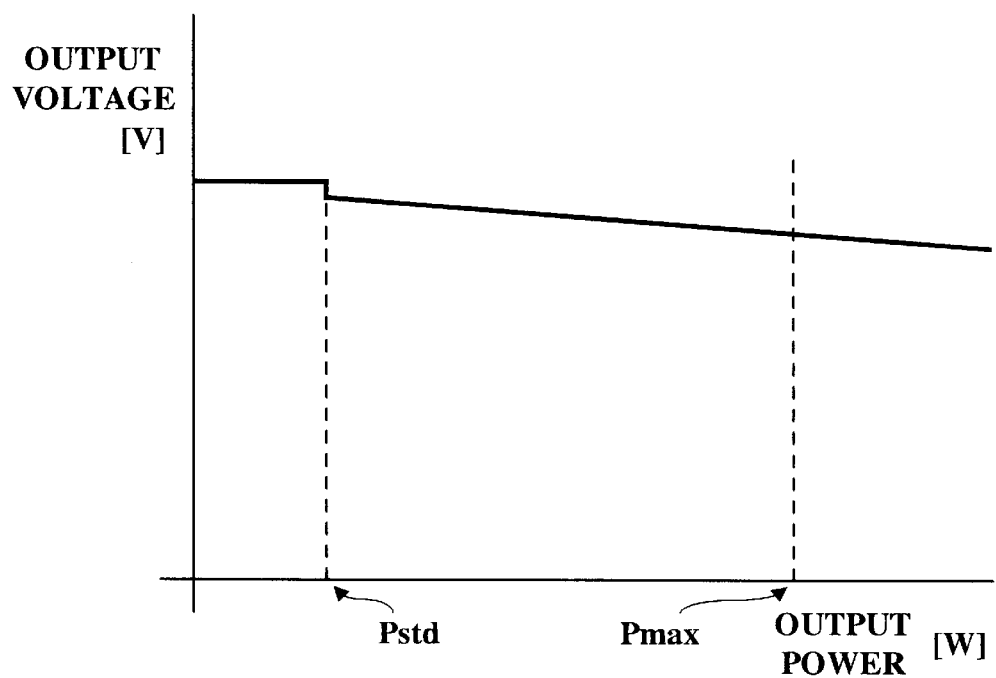
FIG. 7 is a diagram showing the relationship between output power of a DC-to-DC converter and an output voltage of a power-factor control circuit, in the AC-to-DC converter of the embodiment of the present invention.

FIG. 7 shows the relationship between the output voltage of the DC-to-DC converter 40 and the output voltage of the power-factor control circuit 20.

An increase in the power consumption of the loads 51 and 53 causes a decrease in the voltage of the capacitor 30. The decrease in the voltage of the capacitor 30 causes the diode 241 to be turned on. Then, a forward current flows to and through the diode 241. In such circumstances, the AC-to-DC converter according to the embodiment of the present invention operates as a well-known capacitor/input type converter. As a result, the capacitor 30 is charged immediately by a current flowing from the full-wave rectifier 21, and a voltage drop of the voltage can be avoided. As illustrated in FIG. 7, even if the output power of the DC-to-DC converter 40 gets greater than the maximum power consumption Pmax [W], the output voltage thereof does not suddenly drop.

The power-factor control circuit 20 included in the AC-to-DC converter of this embodiment controls the charge/discharge operation of the capacitor 30 through the switching operation of the switching device 25, when the output power of the DC-to-DC converter 40 is equal to or less than predetermined reference power Pstd [W]. The reference power Pstd [W] is within a range from one sixteenth to half of the maximum power consumption. When the output power of the DC-to-DC converter 40 is greater than the reference power Pstd [W], the power-factor control circuit 20 controls the charge/discharge operation of the capacitor 30, by directly supplying the current output from the full-wave rectifier 21.

The present invention is not limited to the above, and various modifications and changes can be made thereonto.

Figure 8:
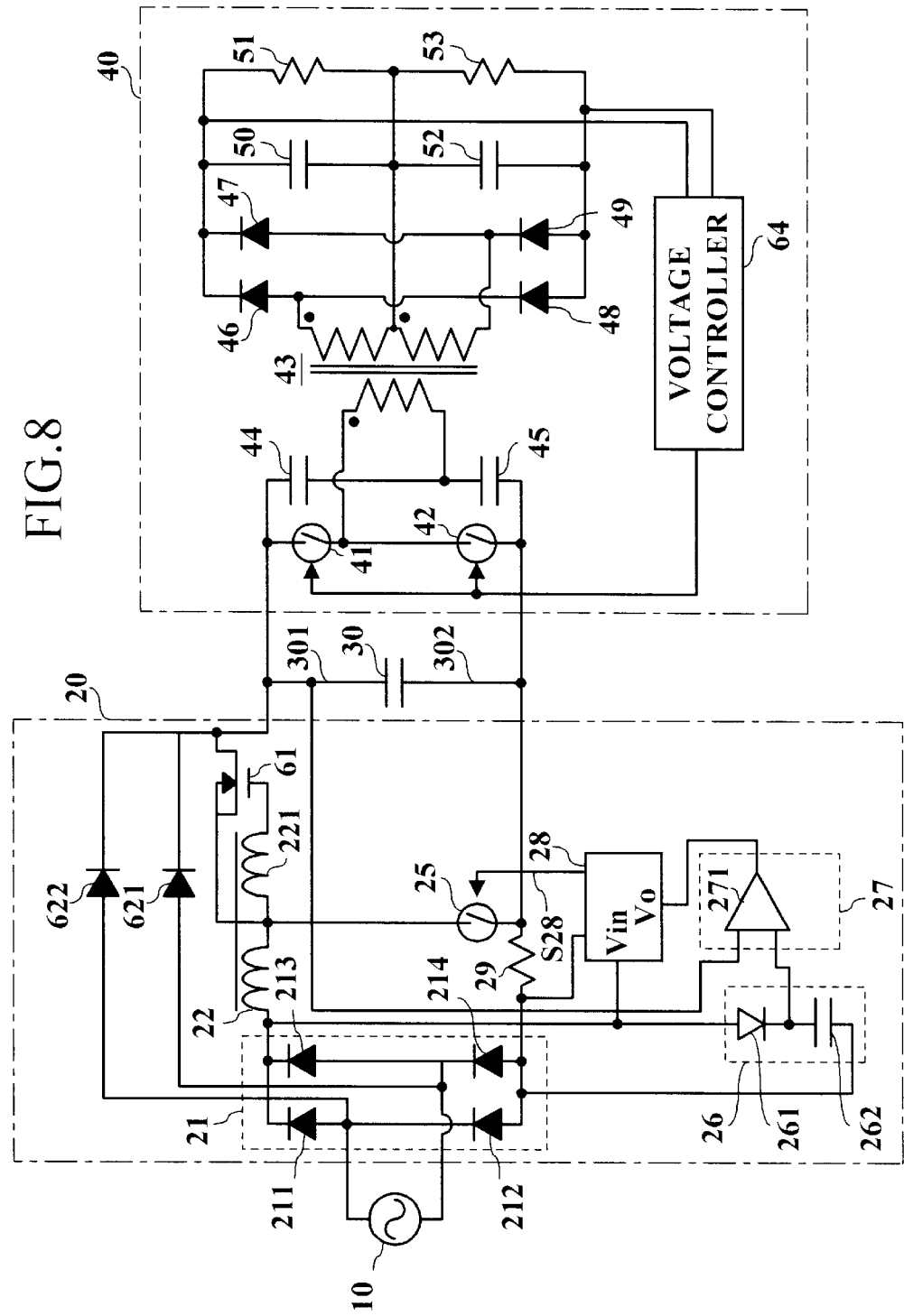
FIG. 8 is a diagram showing a modification of the AC-to-DC converter of the present invention.

FIG. 8 shows a modification of the AC-to-DC of the present invention.

Figure 9:
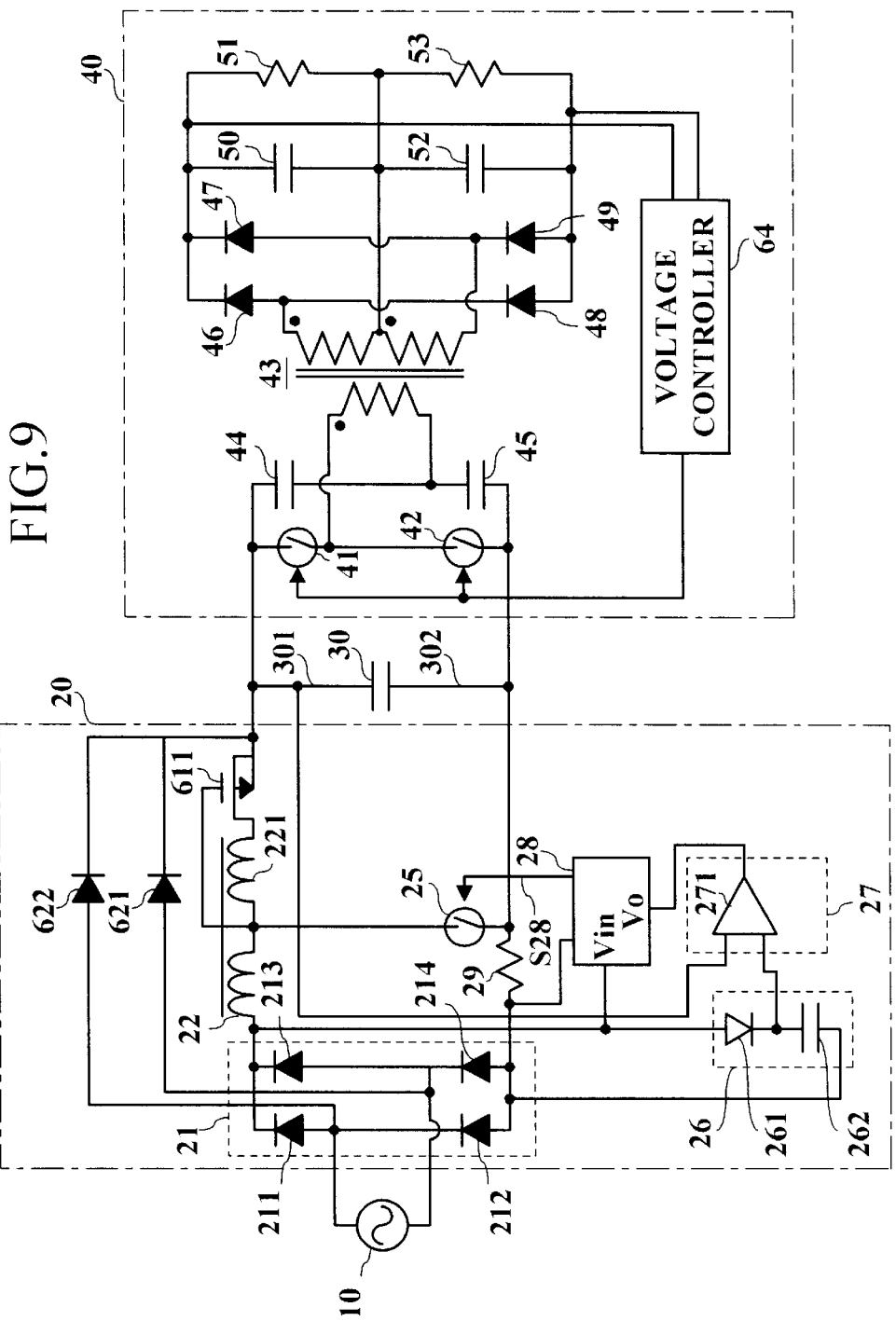
FIG. 9 is a diagram showing another modification of the AC-to-DC converter of the present invention.

As shown in FIG. 8, the rectification device 23 shown in FIG. 3 may be an FET (Field Effect Transistor) 61. The FET 61 has the source coupled to the inductor 22, the drain coupled to the electrode 301 of the capacitor 30, and the gate coupled to an inductor 221. The FET 61 shown in FIG. 8 may be an n-channel type FET, while the rectification device 23 is a p-channel type FET 611 as shown in FIG. 9. The FET 611 has the source coupled to the electrode 301 of the capacitor 30, the drain coupled to the inductor 221 and the gate coupled to the inductor 22. In FIGS. 8 and 9, the inductor 221 may be realized using a tap arranged in the inductor 22.

The by-pass device 24 shown in FIG. 3 may comprise diodes 621 and 622 shown in FIGS. 8 and 9. The diode 621 has an anode coupled to one end of the AC power source 10 and a cathode coupled to the electrode 301 of the capacitor 30. The diodes 622 has the anode coupled to the other end of the AC power source 10 and the cathode coupled to the electrode 301 of the capacitor 30.

As illustrated in FIGS. 8 and 9, the DC-to-DC converter 40 may include a voltage controller 64 for controlling an output from the DC-to-DC converter 40.

Figure 10:
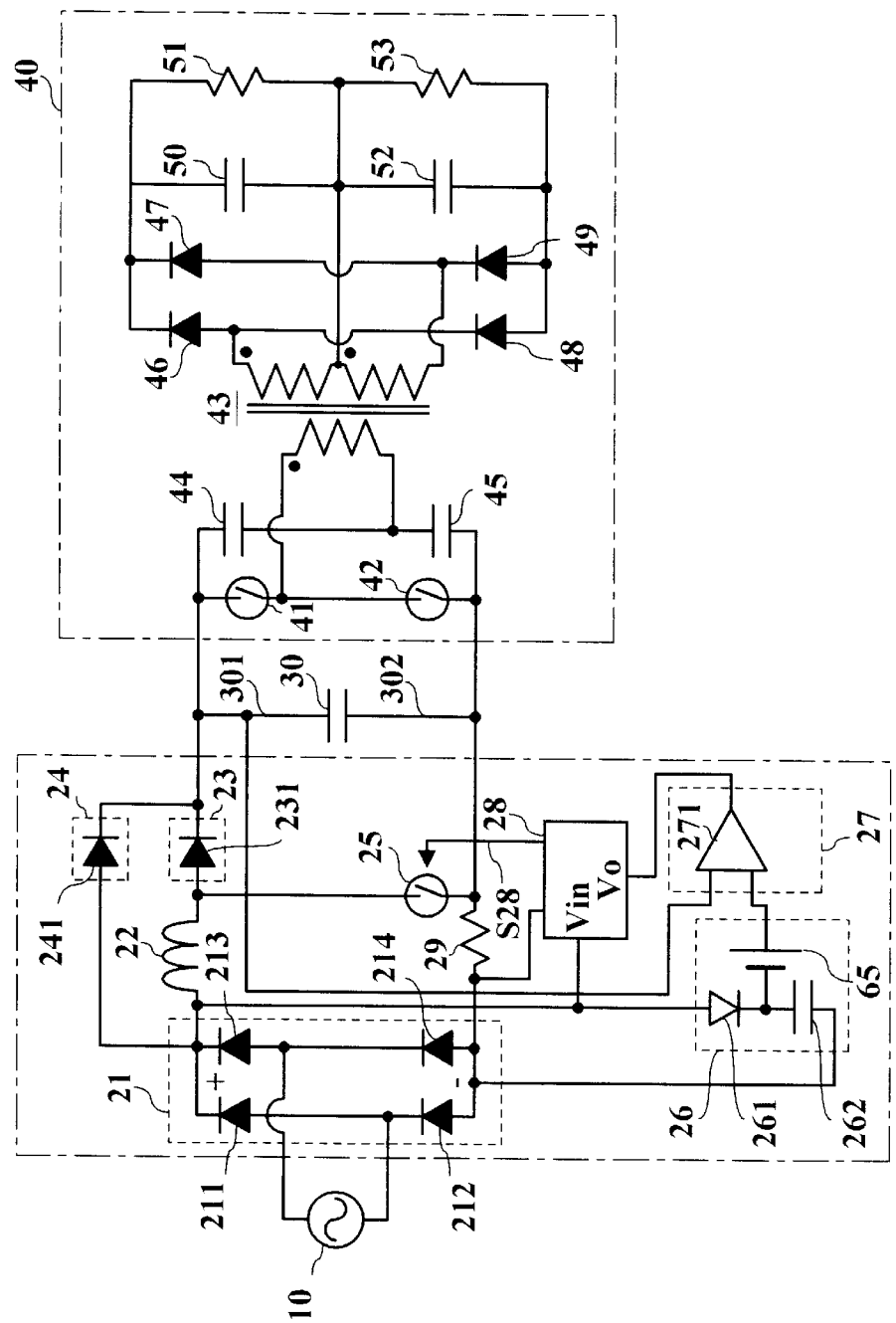
FIG. 10 is a diagram showing still another modification of the AC-to-DC converter of the present invention.

In another modification of the present invention, when the power-factor control circuit 20 controls the charge/discharge operation of the capacitor 30 in accordance with the switching operation of the switching device 25, the voltage of the capacitor 30 may be greater than the peak output voltage of the full-wave rectifier 21 by a predetermined amount of voltage. The peak detector 26 shown in FIG. 10 includes a DC power source 65. The comparator 271 receives a voltage greater than the peak output voltage of the full-wave rectifier 21, by the voltage of the DC power source 65. Then, the voltage of the capacitor 30 is controlled to be greater than the peak output voltage of the full-wave rectifier 21 by the voltage of the DC power source 65.

It is not really necessary that the peak detector 26 detect the peak output voltage of the full-wave rectifier 21. For example, the peak detector 26 may be coupled to the AC power source 10 and detect the amplitude of the AC power source 10.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-49569 filed on Feb. 26, 2001, and including specification, claims, drawings and summary. The disclosure of the above Japanese Patent Application is incorporated herein by reference in its entirety.

What is claimed is:

1. An AC-to-DC converter comprising:
    a power-factor control circuit which is coupled to an AC power source;
    a capacitor which has a first electrode and a second electrode, and whose charge/discharge operation is controlled by said power-factor control circuit; and
    a converter which is coupled to said capacitor, and
    wherein said power-factor control circuit includes
        a rectifier which is coupled to the AC power source,
        a detector which detects a peak output voltage of said rectifier, the detector including a circuit for capturing and maintaining said peak output voltage of the rectifier,
        a switching device which executes a switching operation for charging said capacitor, and
        a switching controller which controls the switching operation of said switching device, based on a detected result of said detector.

2. The AC-to-DC converter according to claim 1, wherein said power-factor control circuit
    charges said capacitor in accordance with the switching operation of said switching device, such that a voltage in said capacitor will be equal to the peak output voltage detected by said detector or greater than a peak output voltage of said detector by a predetermined amount of voltage.

3. The AC-to-DC converter according to claim 1, wherein said power-factor control circuit includes:
    an inductor which has a first terminal, coupled to a positive output terminal of said rectifier, and a second terminal; and
    a first device which is connected to said capacitor in order to supply said capacitor with a current, and which is coupled between said second terminal of said inductor and said first electrode of said capacitor.

4. The AC-to-DC converter according to claim 3, wherein said switching device is coupled between said second terminal of said inductor and said second electrode of said capacitor.

5. The AC-to-DC converter according to claim 3, wherein said first device is a diode having an anode coupled to said second terminal of said inductor and a cathode coupled to the first electrode of said capacitor.

6. The AC-to-DC converter according to claim 3, wherein said inductor has a third terminal; and
said first device is an n-channel type field effect transistor having a source coupled to said second terminal of said inductor, a drain coupled to the first electrode of said capacitor, and a gate coupled to said third terminal of said inductor.

7. The AC-to-DC converter according to claim 3, wherein said inductor has a third terminal; and
said first device is a p-channel type field effect transistor having a source coupled to the first electrode of said capacitor, a drain coupled to said third terminal of said inductor, and a gate coupled to said second terminal of said inductor.

8. The AC-to-DC converter according to claim 3, wherein said power-factor control circuit includes a second device coupled to said inductor and said first device in parallel thereto, in order to transmit a current from said rectifier to said capacitor in a case where a voltage of said capacitor drops.

9. The AC-to-DC converter according to claim 8, wherein said second device is a diode having an anode coupled to a positive output terminal of said rectifier and a cathode coupled to the first electrode of said capacitor.

10. The AC-to-DC converter according to claim 8, wherein said second device includes:
a first diode coupled between one end of said AC power source and the first electrode of said capacitor; and
a second diode coupled between other end of said AC power source and the first electrode of said capacitor.

11. The AC-to-DC converter according to claim 8, wherein said power-factor control circuit:
controls a charge/discharge operation of said capacitor in accordance with the switching operation of said switching device, in a case where output power of said AC-to-DC converter is equal or less than predetermined reference power; and
controls the charge/discharge operation of said capacitor by a current flowing to and through said second device, in a case where the output power of said AC-to-DC converter is equal to or greater than the reference power.

12. The AC-to-DC converter according to claim 11, wherein
the reference power is within a range between one sixteenth and half of maximum power consumption.

13. The AC-to-DC converter according to claim 1, wherein
said AC-to-DC converter includes a voltage controller for controlling an output from said converter.

14. The AC-to-DC converter according to claim 1, wherein said detector includes
a semiconductor element which has an anode coupled to a positive output terminal of said rectifier, and a cathode; and a capacitive element which is coupled between the cathode of said semiconductor element and a negative output terminal of said rectifier.

15. An AC-to-DC converter comprising:
a power-factor control circuit which is coupled to an AC power source;
a capacitor which has a first electrode and a second electrode, and whose charge/discharge operation is controlled by said power-factor control circuit; and
a converter which is coupled to said capacitor, said power-factor control circuit including an inductor and a first device, the inductor having first, second and third terminals, the first terminal being coupled to a positive output terminal of said rectifier, the first device being connected to said capacitor in order to supply said capacitor with a current, and which is coupled between said second terminal of said inductor and said first electrode of said capacitor, the power-factor control circuit further including a rectifier coupled to the AC power source, a detector which detects a peak output voltage of said rectifier, a switching device which executes a switching operation for charging said capacitor, and a switching controller which controls the switching operation of said switching device, based on a detected result of said detector, said first device being an n-channel type field effect transistor having a source coupled to said second terminal of said inductor, a drain coupled to the first electrode of said capacitor, and a gate coupled to said third terminal of said inductor.

16. An AC-to-DC converter comprising:
a power-factor control circuit which is coupled to an AC power source;
a capacitor which has a first electrode and a second electrode, and whose charge/discharge operation is controlled by said power-factor control circuit; and
a converter which is coupled to said capacitor, said power-factor control circuit including an inductor and a first device, the inductor having first, second and third terminals, the first terminal being coupled to a positive output terminal of said rectifier, the first device being connected to said capacitor in order to supply said capacitor with a current, and which is coupled between said second terminal of said inductor and said first electrode of said capacitor, the power-factor control circuit further including a rectifier coupled to the AC power source, a detector which detects a peak output voltage of said rectifier, a switching device which executes a switching operation for charging said capacitor, and a switching controller which controls the switching operation of said switching device, based on a detected result of said detector, said first device being a p-channel type field effect transistor having a source coupled to the first electrode of said capacitor, a drain coupled to said third terminal of said inductor, and a gate coupled to said second terminal of said inductor.

17. An AC-to-DC converter comprising:
a power-factor control circuit which is coupled to an AC power source;
a capacitor which has a first electrode and a second electrode, and whose charge/discharge operation is controlled by said power-factor control circuit; and
a converter which is coupled to said capacitor, said power-factor control circuit including an inductor and a first device, the inductor having first, second and third terminals, the first terminal being coupled to a positive output terminal of said rectifier, the first device being connected to said capacitor in order to supply said capacitor with a current, and which is coupled between said second terminal of said inductor and said first electrode of said capacitor, the power-factor control circuit further including a rectifier coupled to the AC power source, a detector which detects a peak output voltage of said rectifier, a switching device which executes a switching operation for charging said capacitor, and a switching controller which controls the switching operation of said switching device, based on a detected result of said detector, said power-factor control circuit including a second device coupled to said inductor and said first device in parallel thereto, in order to transmit a current from said rectifier to said capacitor in a case where a voltage of said capacitor drops, said second device including first and second diodes, the first diode being coupled between one end of said AC power source and the first electrode of said capacitor and the second diode being coupled between other end of said AC power source and the first electrode of said capacitor.

* * * * *